(12) United States Patent
Wachtendorf et al.

(10) Patent No.: US 12,549,379 B2
(45) Date of Patent: Feb. 10, 2026

(54) MICROPHONE

(71) Applicant: Sennheiser electronic SE & Co. KG, Wedemark (DE)

(72) Inventors: Sven Wachtendorf, Wedemark (DE); Norbert Werner, San Francisco, CA (US); Alexander Krüger, Burgdorf (DE)

(73) Assignee: Sennheiser electronic SE & Co. KG, Wedemark (DE)

( * ) Notice: Subject to any disclaimer, the term of this patent is extended or adjusted under 35 U.S.C. 154(b) by 95 days.

(21) Appl. No.: 18/371,088

(22) Filed: Sep. 21, 2023

(65) Prior Publication Data

US 2025/0106038 A1    Mar. 27, 2025

(51) Int. Cl.
*H04L 9/32* (2006.01)
*G10L 17/02* (2013.01)
(Continued)

(52) U.S. Cl.
CPC ............ *H04L 9/3247* (2013.01); *G10L 17/02* (2013.01); *G10L 17/06* (2013.01); *G10L 19/018* (2013.01);
(Continued)

(58) Field of Classification Search
CPC ........ G06F 16/113; G06F 21/16; G06F 21/34; G06F 21/44; G06F 21/64; G06F 3/04842; G06F 21/32; G06Q 20/065; G06Q 30/06; G06V 40/16; G10L 15/30; G10L 17/00; G10L 17/02; G10L 17/06; G10L 17/14; G10L 17/26; G10L 19/018; G10L 25/78; G10L 15/26; G10L 17/08; H04L 9/14; H04L 9/3236; H04L 9/3239; H04L 9/3247; H04L 2209/608; H04L 63/0853; H04L 63/10; H04L 63/12; H04L 63/123; H04L 9/3231; H04L 9/3242; H04R 1/08; H04R 3/00; H04N 21/44236; H04N 21/835;
(Continued)

(56) References Cited

U.S. PATENT DOCUMENTS 6,615,171 B1 * 9/2003 Kanevsky ............... G10L 15/30
704/E15.047
7,054,811 B2 * 5/2006 Barzilay ................ G06Q 30/06
704/246

(Continued)

OTHER PUBLICATIONS

Qureshi et al., "Detecting Deepfake Videos using Digital Watermarking," APSIPA Annual Summit and Conference, Tokyo, Japan (Dec. 2021).

(Continued)

*Primary Examiner* — Gerald Gauthier
(74) *Attorney, Agent, or Firm* — Jon E. Gordon; Haug Partners LLP

(57) ABSTRACT

A microphone is provided comprising a microphone capsule adapted to capture an audio signal, an AD converter configured to convert the captured audio signal into a digital signal, a block generator configured to divide the digital audio signal into a plurality of audio blocks, a private key signature unit configured to generate at least one signature based on at least one of the plurality of audio blocks with a private key associated to the microphone and an audio output configured to output the at least one audio block and the generated at least one signature.

17 Claims, 6 Drawing Sheets

(51) Int. Cl.
*G10L 17/06* (2013.01)
*G10L 19/018* (2013.01)
*H04R 1/08* (2006.01)
*H04R 3/00* (2006.01)

(52) U.S. Cl.
CPC ............. *H04L 9/3239* (2013.01); *H04R 1/08* (2013.01); *H04R 3/00* (2013.01)

(58) Field of Classification Search
CPC .... H04N 21/8358; A61B 5/7264; G01H 3/04; H04M 1/05
See application file for complete search history.

(56) References Cited

U.S. PATENT DOCUMENTS

| | | | | |
|---|---|---|---|---|
| 8,078,465 | B2* | 12/2011 | Paul | G10L 25/78 |
| | | | | 704/250 |
| 8,417,954 | B1* | 4/2013 | Sagal | G06F 21/64 |
| | | | | 713/176 |
| 8,819,361 | B2* | 8/2014 | Leet | G06F 16/113 |
| | | | | 707/661 |
| 10,803,873 | B1* | 10/2020 | Warner | G10L 17/08 |
| 11,550,879 | B2* | 1/2023 | Lev-Ami | H04L 63/10 |
| 11,721,346 | B2* | 8/2023 | Lesso | H04L 63/123 |
| | | | | 704/246 |
| 11,922,532 | B2* | 3/2024 | Alattar | G06V 40/16 |
| 12,002,127 | B2* | 6/2024 | Yaffe | H04L 9/3242 |
| 12,132,858 | B2* | 10/2024 | Ramadhane | H04L 9/0891 |
| 2006/0193475 | A1* | 8/2006 | Borke | G06F 21/64 |
| | | | | 380/285 |
| 2008/0235016 | A1* | 9/2008 | Paul | G10L 25/78 |
| | | | | 704/E17.012 |
| 2009/0187405 | A1* | 7/2009 | Bhogal | G10L 17/00 |
| | | | | 704/246 |
| 2009/0208913 | A1* | 8/2009 | Xu | A61B 5/7264 |
| | | | | 434/169 |
| 2009/0259470 | A1* | 10/2009 | Chang | G10L 17/14 |
| | | | | 704/E17.001 |
| 2009/0327144 | A1* | 12/2009 | Hatter | H04L 9/3231 |
| | | | | 340/5.82 |
| 2010/0056055 | A1* | 3/2010 | Ketari | H04M 1/05 |
| | | | | 704/E15.001 |
| 2013/0263227 | A1* | 10/2013 | Gongaware | G06F 21/32 |
| | | | | 726/4 |
| 2017/0180134 | A1* | 6/2017 | King | H04L 63/0853 |
| 2018/0227130 | A1* | 8/2018 | Ebrahimi | G06Q 20/065 |
| 2019/0013027 | A1* | 1/2019 | Page | G06F 21/34 |
| 2020/0127988 | A1* | 4/2020 | Bradley | G06F 21/44 |
| 2020/0374269 | A1* | 11/2020 | Lidman | H04L 63/10 |
| 2021/0250339 | A1* | 8/2021 | Chumura | H04L 9/14 |
| 2021/0287322 | A1* | 9/2021 | Yaffe | H04L 9/3247 |
| 2021/0397751 | A1* | 12/2021 | Iyer | G06F 3/04842 |
| 2021/0402226 | A1* | 12/2021 | Shear | G10L 15/26 |
| 2023/0011743 | A1* | 1/2023 | Paes | G01H 3/04 |
| 2023/0141773 | A1* | 5/2023 | Ramadhane | H04L 9/3236 |
| | | | | 455/410 |
| 2024/0147104 | A1* | 5/2024 | Burke | H04R 3/00 |
| 2025/0106038 | A1* | 3/2025 | Wachtendorf | H04L 63/12 |

OTHER PUBLICATIONS

Neubauer et al., "Advanced Watermarking and its Applications," Fraunhofer Institute for Integrated Circuits IIS, Paper 5176, (Sep. 2000).

https://en.wikipedia.org/wiki/Public-key_cryptography; Apr. 2024.

S. A, A. Thomas, and D. Mathew, "Study of MFCC and IHC Feature Extraction Methods With Probabilistic Acoustic Models for Speaker Biometric Applications," in 8th International Conference on Advances in Computing & Communications, vol. 143, 2018, pp. 267-276.

https://contentauthenticity.org/; Apr. 2024.

International Search Report and Written Opinion mailed Dec. 6, 2024 in corresponding International Application No. PCT/EP2024/076149.

* cited by examiner

MICROPHONE

FIELD OF DISCLOSURE

The present invention relates to a microphone and a method of authenticating an audio signal.

BACKGROUND

In view of modern capabilities of creating deepfake video and deepfake audio, the need has risen to be able to verify or authenticate an audio signal like a speech of a politician etc.

Until now it has been very difficult to authenticate an audio signal of a person. Typically, a lot of manual research must be done in order to verify or authenticate such an audio signal and to verify the source of the audio signal.

SUMMARY OF THE INVENTION

It is therefore an object of the invention to provide a microphone, a method of authenticating an audio signal and an audio signal signing module which enables an easy and robust way to authenticate an audio signal.

This object is solved by a microphone according to claim 1, a method of generating an authenticable audio signal according to claim 6 and an audio signal signing module according to claim 13.

Hence, a microphone is provided which comprises a microphone capsule to capture an audio signal. The microphone also comprises an analog-to-digital converter configured to convert the captured audio signal into a digital signal. A block generator is configured to divide the digital audio signal in a plurality of blocks. Audio features of the digital audio signal can be extracted and a private key is provided to generate signatures based on at least one audio block of the plurality of audio blocks with a private key. Furthermore, the microphone comprises an audio output configured to output the captured audio signal and the generated signatures.

According to an aspect, the signature is generated based on the audio blocks or the audio features of the audio blocks.

According to an aspect, a hash generator is provided to generate a hash value based on at least one audio block or a hash value based on audio features of the at least one audio block. The private key can be provided to generate a signature for the hash values. The use of the hash values is advantageous as it enables an effective data reduction.

It becomes thus possible to determine whether a transmitted audio signal was captured or signed by a specific microphone or a specific software entity.

According to an aspect of the invention, the microphone also comprises a watermark generator to generate a watermark based on a signature based on at least one audio block, based on signatures of audio features of the at least one audio block, based on signatures of hash values of the at least one audio block and/or the signatures of hash values of the audio features of at least one audio block and introduce the watermark into the at least one block such that the audio signal with the embedded watermark is outputted via the audio output. The watermark generator can also generate a watermark based on the signed values and/or the signatures based on audio features of the at least one audio block.

Accordingly, at the output of the microphone, the detected audio signal as well as the generated signatures are outputted. Accordingly, the detected audio signal as well as the generated signatures can be transmitted together. In an example, the watermark generator generates a watermark based on the generated signatures and introduces the watermark into the at least one audio block. Preferably, a watermark is introduced into each audio block such that each audio block can be used to verify the authenticity of the audio signal based on the values embedded in the audio block.

The cryptographic signing and verification of the cryptographic signature of the hash or audio feature values can be performed with a private key and public key pair.

Preferably, the signed values (i.e. the signatures) as well as the plurality of audio blocks are transmitted together. Alternatively, they can be transmitted via different ways or channels.

According to an aspect of the invention, a watermark containing generated signatures for one audio block can be transmitted in a subsequent audio block. This can be advantageous if the audio signal is to be transmitted live such that any delay can be reduced. This is also possible if the signed values are not embedded in a watermark but are transmitted differently (e.g. via a live stream based on IP, TCP UDP protocol).

According to an aspect of the invention, the watermark can comprise metadata of the captured audio signals. The metadata can comprise a microphone identification, position/location information of the microphone, time and data of the recording and/or a microphone model, etc.

Alternatively, the metadata can also be transmitted via a different communication channel. Optionally, a signature of the metadata can be generated based on the private key.

According to an example, a signed metadata value of a previous block can be embedded in a current audio block or transmitted together with the current audio block. As the audio blocks are arranged in a chain of audio blocks and are optionally sequentially numbered, it is possible to detect if a block is missing or has been removed from the chain of audio blocks. Even if no sequential numbering is present, the removal of an audio block can be noticed when the signed metadata of one block is transmitted together with a following block. A removal of one block would lead to a mismatch of metadata and audio blocks and therefore show a manipulation of the signal.

The metadata values of the audio blocks (e.g., audio features, time of recording, sequence number, location of recording, . . . ) are signed with a signature with a private key of the signing entity (like a microphone or a software) and can be authenticated by checking the signature with a public key.

At the receiver side, the metadata (e.g., the signed audio features or hash values of the received audio signal) can be authenticated by checking the signature of the values. Furthermore, the received audio features or hash values are compared with the audio features or hash values of the received audio signal. If the signature is validated and the comparison of the values is positive, than the received audio signal is authentic. It is also possible to define a similarity threshold to accept an audio signal as authentic.

If hash values have been extracted from audio features of the audio signal, at the receiver side the hash values are authenticated by checking the signature of these hash values. Thereafter, the hash values of the audio features of the received audio signal are compared to the received hash values.

If no hash values are used, the audio features of the audio signal or the audio block can be signed (i. e. a signature is generated) and embedded into the transmitted audio signal or transmitted on an alternative channel (e.g., storage on cloud server). At the receiver side the embedded audio characteristics is extracted or received via a different channel (e.g., download from cloud server) and compared to the audio characteristics of the received signal to authenticate the received signal. The comparison algorithm can accommodate for changes e.g., in the volume and/or equalization of the received signal. Hence, the comparison ca be more robust. Additionally, the signature of the signed metadata can be checked to authenticate the signer of the audio file.

The invention also relates to a conference system which comprises a microphone for detecting the audio signal of the participants. The microphone can correspond to the abovementioned microphone such that it outputs blocks of audio data together with signed metadata.

The authenticity check of the received audio signal can be performed by a decoder which can, for example, be implemented at a cloud service, a computer, a tablet or a smart device.

The block divider can be used to divide the audio signals into a plurality of audio blocks. The length of the audio blocks can for example be between 0.5 s to 20 s or between 1 and 10 seconds. In each or in each $n^{th}$ audio block, a digital watermark is embedded. The digital watermark can comprise hash values, audio features or hashed audio features of the current audio block or previous audio blocks and optional further metadata like location or time of recording which are signed with a private key of the microphone. Preferably, this is performed before the audio signal is outputted via the audio output of the microphone. In other words, according to one example, the generation of the signed metadata and the embedding of the signed metadata or watermarks into the audio signal can be performed inside the microphone.

Alternatively, the generation of the signed metadata and the embedding of the signed metadata can be performed outside the microphone, like in a smart device coupled to the microphone or later on in an audio processing software.

The audio blocks of the audio signals can be arranged in a sequence such that each audio block can have a sequence number. This is advantageous as later on during the authentication of the audio signal it can be determined whether an audio block has been removed from the chain of audio blocks by examining the sequence numbers of the audio blocks. This can also detect a changed order of the original blocks.

Optionally, metadata of the audio block (like the user of the microphone, the date, the time, a GPS position, etc.) can also be embedded into the watermark. Thus, the probability is improved that the result of the authentication is reliable.

According to an aspect of the invention, a method of generating an authenticable audio signal is provided. An audio signal is captured or an already captured audio signal is received. The captured or received audio signal is converted into a digital signal if required. The digital audio signal is divided into a plurality of audio blocks. The audio blocks or hashes of the audio blocks are signed with a private key or audio characteristics of the audio blocks are signed with a private key. The at least one audio block and the signed audio blocks or the signed audio characteristics are outputted.

The invention also concerns an audio signal signing module. The audio signal signing module serves to sign metadata of the audio signal with a private key. This metadata contains an audio signal or an audio characteristic of the audio blocks. The metadata can contain further information like location, time or sequence number. The signed audio signal or the audio signal and the signed audio characteristics can then be transmitted or stored. Afterwards, the signature of the received audio signal or the received audio characteristics can be checked with a public key in order to determine whether the audio signal is authentic.

In order to reduce the amount of data for the signature unit, hash values of the audio blocks of the audio signals or hash values of the audio characteristic of the audio bocks can be determined. In this case, the hash values can be signed with the private key. Thereafter, the audio signal as well as the signed hash values can be transmitted together. Optionally, the hash values can be transmitted on a different channel.

The signature unit can sign at least one of the plurality of audio blocks, at least one audio characteristic of the at least one audio block with a private key, a hash value of the at least one audio block with a private key or a hash value of the at least one audio characteristics of the at least one audio block with a private key.

In order to further identify the origin (e. g. the speaker) of the audio signal, these information can be included into the watermark as metadata (e.g. time, date, position speaker id etc.). Alternatively, this information can be stored on a (central) server or a distributed ledger. This metadata can also be signed with the private key.

BRIEF DESCRIPTION OF THE DRAWINGS

These and other aspects of the invention are described in more detail with reference to the following figures.

DETAILED DESCRIPTION

Figure 1:
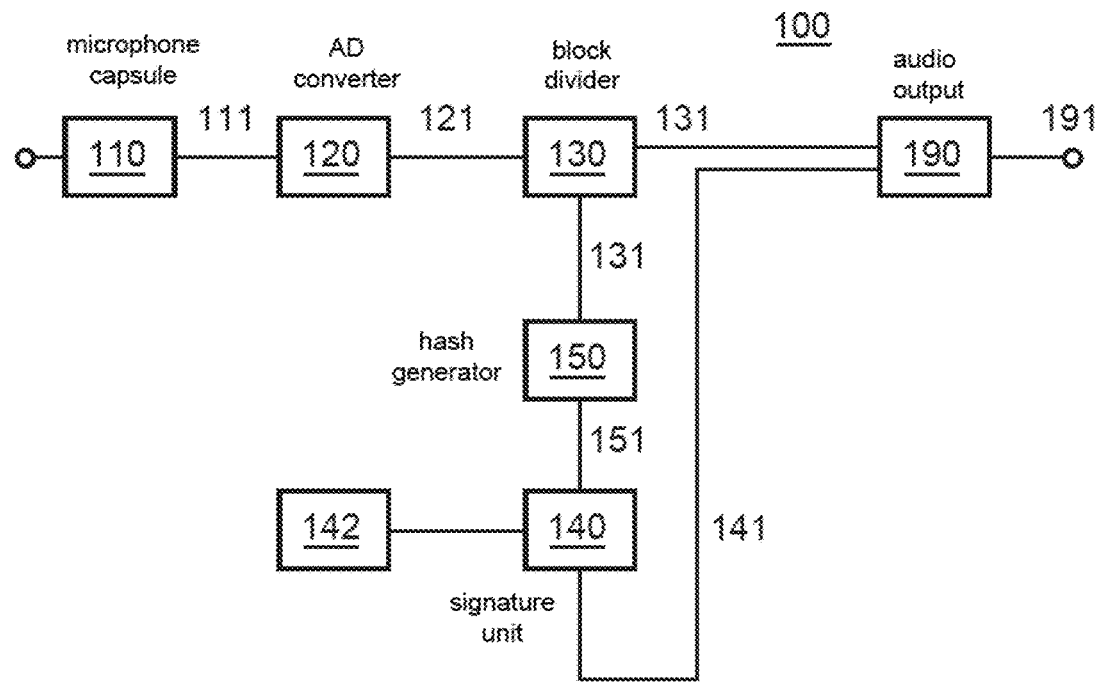
FIG. 1 shows a block diagram of a microphone according to an embodiment.

FIG. 1 shows a block diagram of a microphone according to an embodiment. The microphone 100 comprises a microphone capsule 110 which captures an audio signal and outputs a detected audio signal 111. The microphone 100 also comprises an analog-to-digital AD converter 120 which digitizes the captured audio signal 111 and outputs a digital audio signal 121. Furthermore, a block divider 130 is provided which divides the digital audio signal 121 into a plurality of audio blocks 131. The plurality of audio blocks 131 are inputted into a hash generator 150 which generates hash values 151 for each audio block 131. The hash values 151 are inputted to a signature unit 140, where each hash value 151 is signed with the private key 142 of the microphone 100. The output 141 of the signature unit 140 corresponds to the hash values signed with the private key 142. At an audio output 190, the plurality of audio blocks 131 as well as the signed hash values 141 are outputted together while the hash values can be embedded e.g., as metadata in a file or stream into the output audio signal 191. Alternatively, the hash values can be transmitted in a separate stream.

Hence, according the example of FIG. 1, the authentication is preformed based on hash values of the audio signal. In other words, the signed hash values can be authenticated at the receiver's side based e. g. on a public key. This enables a bit accurate examination.

According to a different example of FIG. 1, the plurality of audio blocks 131 can be directly inputted to a private key signature unit where a signature of at least one audio block 131 of the plurality of audio blocks is generated based on the private key. The generated signature 141 can be outputted to the output where the audio blocks together with the generated signatures 141 are outputted. In this example, no hash values are generated and a signature is directly generated of the audio blocks.

According to a further example of FIG. 1, audio features of the audio blocks can be determined and the private key signature unit 140 generates a signature based on the audio features of the audio blocks and outputs the generated signature 141 via the output unit 190.

Figure 2:
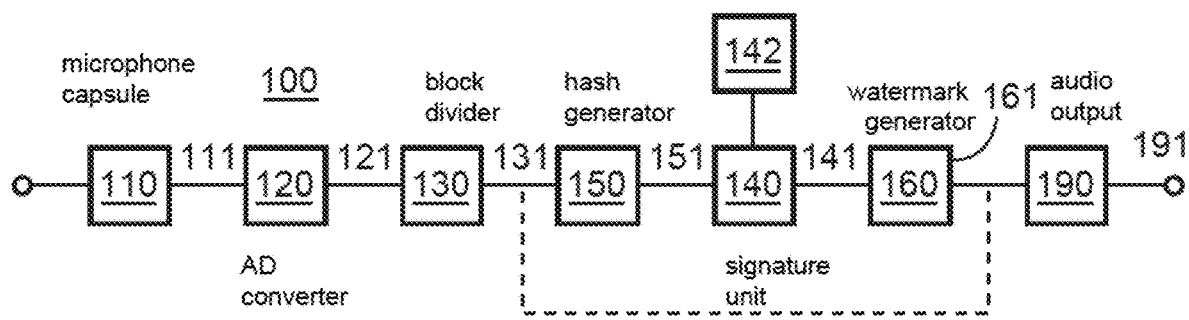
FIG. 2 shows a block diagram of a microphone according to a further embodiment.

FIG. 2 shows a block diagram of a microphone according to a further embodiment. The microphone 100 comprises a microphone capsule 110 which captures an audio signal and outputs a captured audio signal 111. The captured audio signal 111 is forwarded to the analog-to-digital AD converter 120 which digitizes the audio signal 111 and outputs a digital audio signal 121. The digital audio signal 121 is inputted to the block divider 130 which outputs a plurality of audio blocks 131. Optionally, the audio blocks 131 are forwarded to a hash generator 150 which generates a hash value 151 for each audio block 131. In a private key signature unit 140, the hash values 151 of each audio block 131 are signed with the private key 142 and optionally encrypted and the signed hash values 141 are outputted to a watermark generator 160 which generates a watermark 161 and embeds the watermark 161 into the plurality of audio blocks 131. The hash generator 150 can also generate hash values of audio features of the audio blocks. An audio output 190 receives the plurality of audio blocks 131 with the embedded watermark 161 and outputs the audio blocks 131 together with the embedded watermark 161 as output audio signal 191.

Preferably, a watermark 161 is embedded into each audio block 131. It is, however, also possible to embed the watermark into only some of the audio blocks.

Accordingly, at the output of the audio output 190 (i.e. at the output of the microphone 100), the audio blocks 131 with the embedded watermark 161 are outputted. This audio signal (with the embedded watermark) can be stored or transmitted. As a watermark 161 is embedded into e. g. substantially each audio block 131, each audio block 131 can be individually authenticated. If the watermark with the hash values of an audio block is embedded in a subsequent audio block, then the current block and the subsequent audio block are requested for authentication. The watermark 161 can also be embedded only in some of the audio blocks. The watermark can also comprise further information like the block boundaries. This information can be used when authenticating the audio signal.

According to an example of FIG. 2, the generation of the hash values can be omitted and the audio blocks or audio features of the audio blocks can be received by the private key signature unit 140 which generates a signature based on the private key 142 and outputs the generated signatures 141 to the watermark generator 160 which generates a watermark based on the generated signatures. This example is advantageous as it does not required the generation of hash values of the audio blocks or hash values of the audio features of the audio blocks.

The authentication of an audio signal can thus be performed by verifying the signature of audio features or the hash values of the plurality of audio blocks based on a public key associated with the private key 142. Furthermore, the verified hash values or audio features are compared to the hash values or audio features of the plurality of received audio blocks to determine whether the audio signal has been altered. If the hash values or audio features correspond to each other, then the audio signal can be authenticated.

An audio watermark can be a distinct identification which is embedded in an audio signal and which is for example previously used for identifying a copyright information of the audio signal. Preferably, the watermark is embedded into the audio signal such that it becomes very difficult to remove or destroy the watermark. Preferably, if the audio signal with the embedded watermark is copied, stored or transmitted, the embedded watermark will not change.

Figure 3:
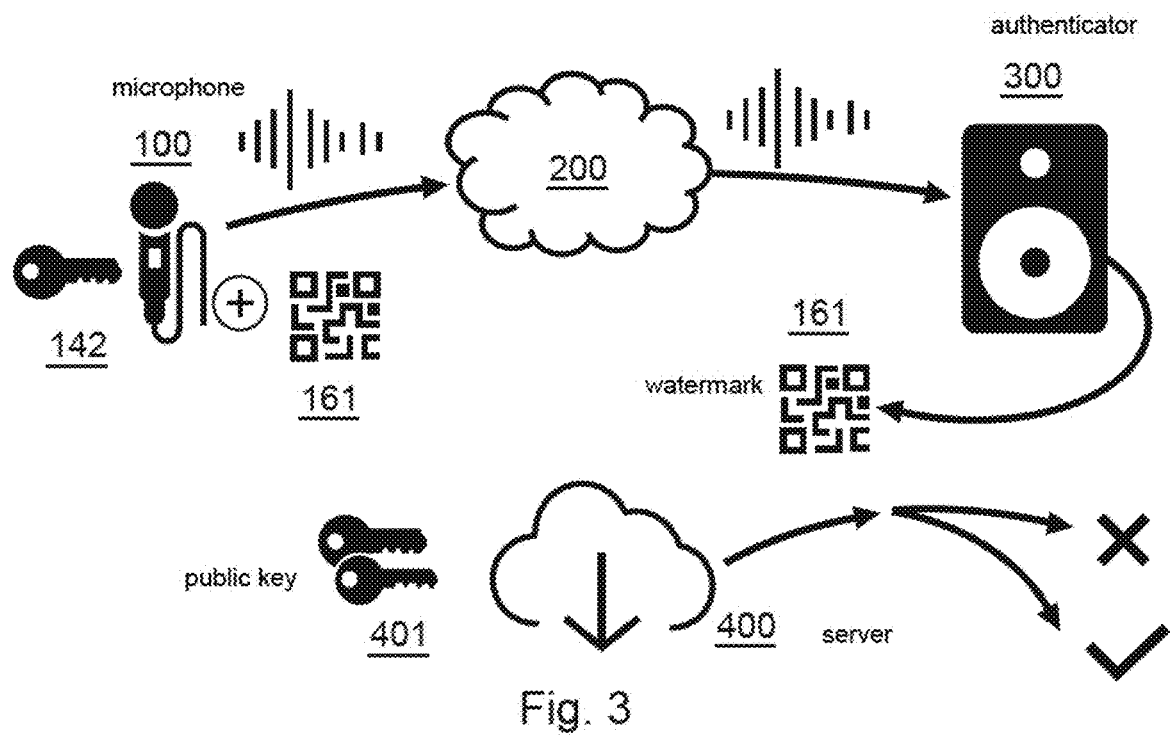
FIG. 3 shows a schematic representation of an authentication of an audio signal detected by a microphone.

Hence, according to the example of FIG. 2, the authentication is performed based on hash values of the audio signal or hash values of audio features and the use of watermarks. This enables a bit accurate verification. FIG. 3 shows a schematic representation of an authentication of an audio signal. E. g. a microphone 100 is used to capture an audio signal. The audio signal can also be an audio signal captured beforehand The captured audio signal is divided into a plurality of audio blocks and at least one signature is generated based on the at least one audio block (or audio features of the at least one audio block). Optionally, hash values of the audio blocks or hash values of audio features of the audio blocks can be generated and be signed with a private key 142 of the microphone 100. In particular, a watermark 161 can be embedded into the audio signal. The audio signal can be transmitted via a network 200 or stored. An authenticator 300 can receive the audio signal with the embedded watermark and can validate the signature of the signed audio block or the signed audio features based on a public key 401 associated to the microphone which can be stored, for example, on a server 400 or a distributed ledger.

Optionally, if hash values have been used, the hash values can be extracted and the extracted hash values can be compared to hash values based on the received audio signal in order to authenticate the audio signal.

Hence, according to the example of FIG. 3, the authentication is performed based on signatures of audio block and the use of watermarks. This enables a bit accurate verification.

Figure 4:
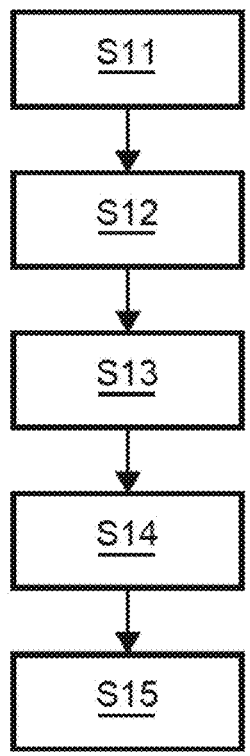
FIG. 4 shows a block diagram of a method of providing an authenticable audio signal.

FIG. 4 shows a block diagram of a method of generating an authenticable audio signal. In step S11, a microphone 100 captures an audio signal or the audio signal is received. The audio signal is digitized in the AD converter 120 and a block generator 130 divides the audio signal into a plurality of audio blocks. If the audio signal is already a digital audio signal, the AD conversion can be omitted. In other words, the audio signal is processed based on audio blocks. A length of one audio block can be, for example, between 1 and 10 seconds. In step S12, a watermark can be generated based on a watermark generator 160 and embedded into the audio signal. This watermark can contain metadata of a previously processed audio block. Optionally step S12 can be omitted. In step S13, audio features of an audio signal can be extracted which can correlate with the audible features or audio characteristics of the audio signal. One example thereof is MFCC (Mel Frequency Cepstral Coefficient) that can be calculated from audio signals.

In step S14, hash values of the audio blocks or hash values of audio features can be determined. Such a hash value can for example be determined by the MD5 or SHA-256 method. The hash values can be determined based on the audio signal or based on audio features of at least one audio block. The hash values are determined either based on the audio blocks or based on the audio features. It is also possible to skip the hashing and just extract audio features of at least one audio block.

In step S15, a signature of audio blocks or of audio features of audio blocks are generated based on a private key 142. Furthermore, a signature can be generated based on metadata (hash values, audio features or further data). The private key can be associated to the microphone or a signing entity. The watermark which is to be embedded into the audio blocks can comprise the hash values of the audio features of an audio block or the audio features directly (without hash values) possibly together with further information, for example, a sequence number of an audio block, optionally a date, time and position etc. and a digital signature. By means of the private key associated with the microphone and the signing of the metadata with the private key, the resulting audio signal can be identified.

Figure 5:
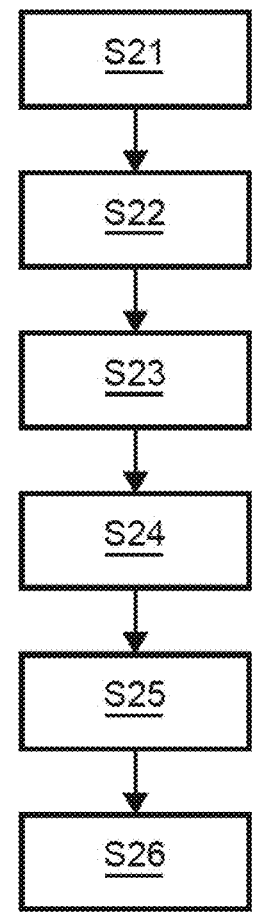
FIG. 5 shows a block diagram of a method of authenticating an audio signal.

FIG. 5 discloses a flow chart of a method of authenticating an audio signal. In step S21, the received audio blocks are examined in order to determine the block boundaries. This can, for example, be performed by means of a synchronizing signal. Once the block-by-block boundaries are determined, the flow continues to step S22 where the watermark 161 is extracted from the audio blocks. The extracted watermark 161 can be associated to the current audio block or to a previous audio block.

In step S23, a public key 401 is used to verify the signature of the signed metadata embedded in the audio blocks. This is advantageous as any manipulation of the watermarks can be detected and the microphone which has previously captured the audio signal can be identified.

In step S24, the audio features of an audio block can be extracted.

In step S25, the audio features of the received audio blocks are determined and are compared with the embedded audio features of the received audio block. If the audio signal has been tempered, the audio features of the received audio signal will not correspond to the audio features embedded in the received audio signal.

In step S26, optionally, the block number of an audio block which can be embedded in the watermark is determined and compared to previous sequence number in order to determine whether any audio block is missing or if the order of the blocks has been modified.

If a watermark containing information on an audio block is embedded into the same audio block, it must be ensured that audio features are used which are robust-meaning that the watermark does not have a too large effect on the audio features. As an example, such audio features can relate to the human hearing abilities. Alternatively, if a current audio block is embedded with a watermark associated to a previous audio block, this watermark is known before the audio features of a current audio block are determined. Therefore, a watermark associated to a previous audio block can be embedded into the current audio block before the audio features are determined. This allows that for signing as well as for authentication the algorithms work on the same-already watermarked-audio signal.

If a microphone is used to detect a live audio signal and thus the audio transmission must be performed with a low latency (for example, like a live interview or a press conference), then optionally, the hash values of an audio block can be embedded as a watermark into a subsequent audio block. This is advantageous, as the latency can be reduced as an audio signal can be outputted without having to wait for the end of the current audio block.

In this scenario, it is possible to detect any tempering of the audio signals even if the watermark does not comprise sequence numbers of the audio blocks. However, the use of sequence numbers as part of the watermark can provide more information about the modification of the audio stream/file.

The disadvantage of using an offset of the hash values by including hash values into a watermark of a subsequent audio block is that at the end of the audio sequence, a last audio block cannot be authenticated. If, however, the lengths of the audio blocks are between 1 and 10 seconds, this should not be a problem.

According to an example, each audio signal which is captured by the microphone 100 and which is outputted by the microphone can comprise a watermark by means of which it is possible to determine the actual microphone which has captured the audio signal. If the microphone is registered, then it is possible to identify the respective microphone. By means of the sequence numbers of the audio blocks or the embedding of metadata in a subsequent audio block, it can be determined when part of the audio signal has been removed.

It is also possible to determine when an audio signal has been introduced between subsequent audio blocks or when the order of the original audio blocks has been changed.

According to the invention, a method is provided for authenticating an audio signal which has been detected by a microphone. A pair of private key and public key is used to authenticate the received audio signal. This is advantageous, as neither the microphone nor the decoder must be online. All required information is embedded in the audio signal.

Optionally, the audio signal could be part of a video file.

Optionally, the signed metadata can be included in an audio file (e.g., similar to ADM file format) instead of including it into a watermark. In this case the audio signal may not be modified.

Optionally, the signed metadata can be transmitted independent of the audio signal. In this case no watermarking is performed. E.g., the metadata could be uploaded to a webserver or distributed ledger while the audio is distributed via another channel. In this case either the metadata or the audio signal or both may need some kind of synchronization information to be able to assign the right metadata to the right audio block. This could e.g., consist of audio features or a block number.

Optionally, the process of generating a signed audio signal could be performed in a software solution based on a pre-existing audio recording or an audio stream. The private key can be entered to the software e.g., by dongle, text input, and authorized e.g., by biometric signal like fingerprint or face detection.

Optionally, the authentication process could calculate a similarity score between the audio features of the signed audio signal and the analysed signal. This could allow to give a likelihood that the signal is still authentic even if minor signal processing like e.g., gain has happened. Here, hash values are not determined.

According to the invention, a method to prove the authenticity of an audio signal by digital signatures is provided.

This means for a signed audio signal it is possible to check whether the supposed creator of an audio signal is the true creator. Furthermore, it is possible to check if the audio signal has been altered after creation (changes in the signal, removal of parts of the recording and addition of other audio recordings).

Figure 6:
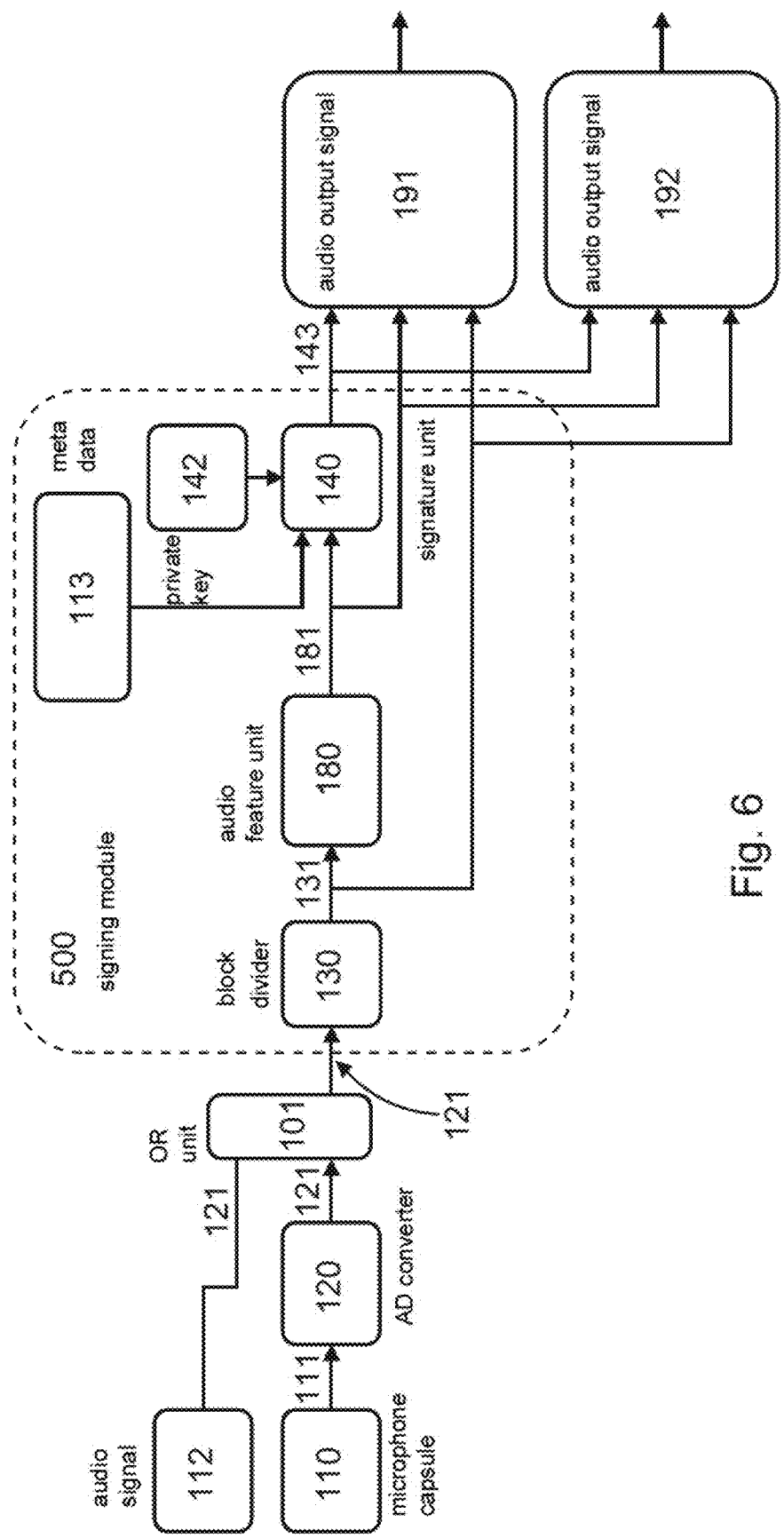
FIG. 6 shows a block diagram of an audio signal signing module.

FIG. 6 shows a block diagram of an audio signal signing module. The audio signal signalling module 500 comprises a block divider 130 which divides a digital audio signal 121 into a plurality of audio blocks 131. Optionally, the block divider can be omitted if the audio signal is already divided into audio blocks. Furthermore, an audio features unit 180 can be provided which extracts an audio features out of the audio blocks of the plurality of audio blocks 131 and outputs audio related information 181. A private key signature unit 140 is provided which can receive the audio related information 181, and which can generate a signature based on the audio signal and/or audio features 143 (i.e. audio related information). The signature unit 140 can output the plurality of audio blocks and the audio feature information separately.

According to an example, a digital audio signal 121 can be divided into a plurality of audio blocks 131 with a length of e.g., 1-10 seconds in a block divider 130. To be able to authenticate the audio signal later on, an audio related information is obtained that can be generated from the audio signal during the process of signing. This could be either a block of the digital audio signal 131 itself, or audio features that are extracted from an audio block (optionally a hash generated from a block of the digital audio signal, or a hash generated from the audio features of one audio block). Further information 113 like location or time together with these audio signal related information can be digitally signed with a private key 142.

The private key 142 can be either be part of the software/hardware since production or could be provided by other means e.g., by a dongle, a keypad or other. Additionally, the private key could be unlocked by some form of user authentication e.g., a biometric sensor or a password. For each private key a public key exists to verify the digital signature. Per user/device/institution a unique key pair should be used. The metadata that is later used for authentication can further contain a hash of the audio block or a hash of the features of an audio block or the features of an audio block, optionally together with further information like time or position, and mandatory with a digital signature that signs these pieces of information. These pieces of information together with the digital signature could be either added to the audio signal as a separate stream of metadata, embedded as metadata in an audio file, or be embedded into the audio signal by a watermarking method. It is also possible to distribute the signed metadata and the audio recording over separate channels. In case the metadata are not embedded into the audio signal itself they could contain a reference like an absolute or relative timestamp to connect it to an audio block.

Optimally, to reduce the amount of data that must be provided beside the audio signal (either embedded or as metadata) it is possible to only sign a hash value of the metadata. In this case e.g., the full audio features of a block plus additional information like location are provided plus a signature of the hash of the aforementioned values. This could lead to a shorter digital signature.

Figure 7:
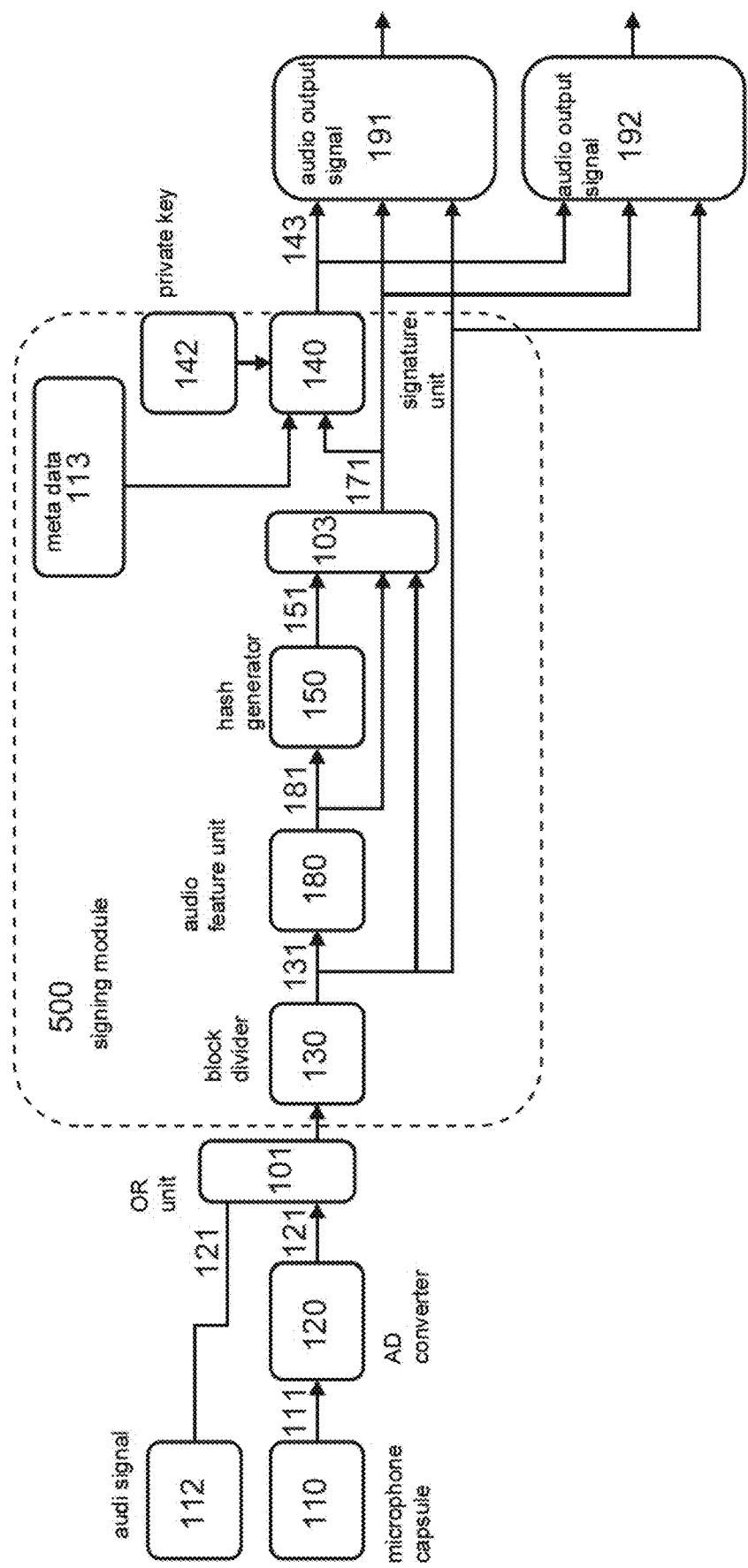
FIG. 7 shows a block diagram of an audio signal signing module.

FIG. 7 shows a block diagram of an audio signal signing module. The audio signal signing module according to FIG. 7 substantially corresponds to the audio signal signing module of FIG. 6 with the addition that a hash generator 150 is provided. The hash generator 150 can generate hash values 151 based on the audio blocks 131 of the plurality of audio blocks or based on the audio features from block 180. The signature unit 140 is able to sign the audio blocks 131. It can sign the extracted audio features of the audio blocks and/or it can sign the hash values 151 of the audio blocks or the extracted audio features.

An Or unit 103 is provided which receives the audio blocks 131, the audio related information 181 and the hash values 151 and outputs one of them.

Figure 8:
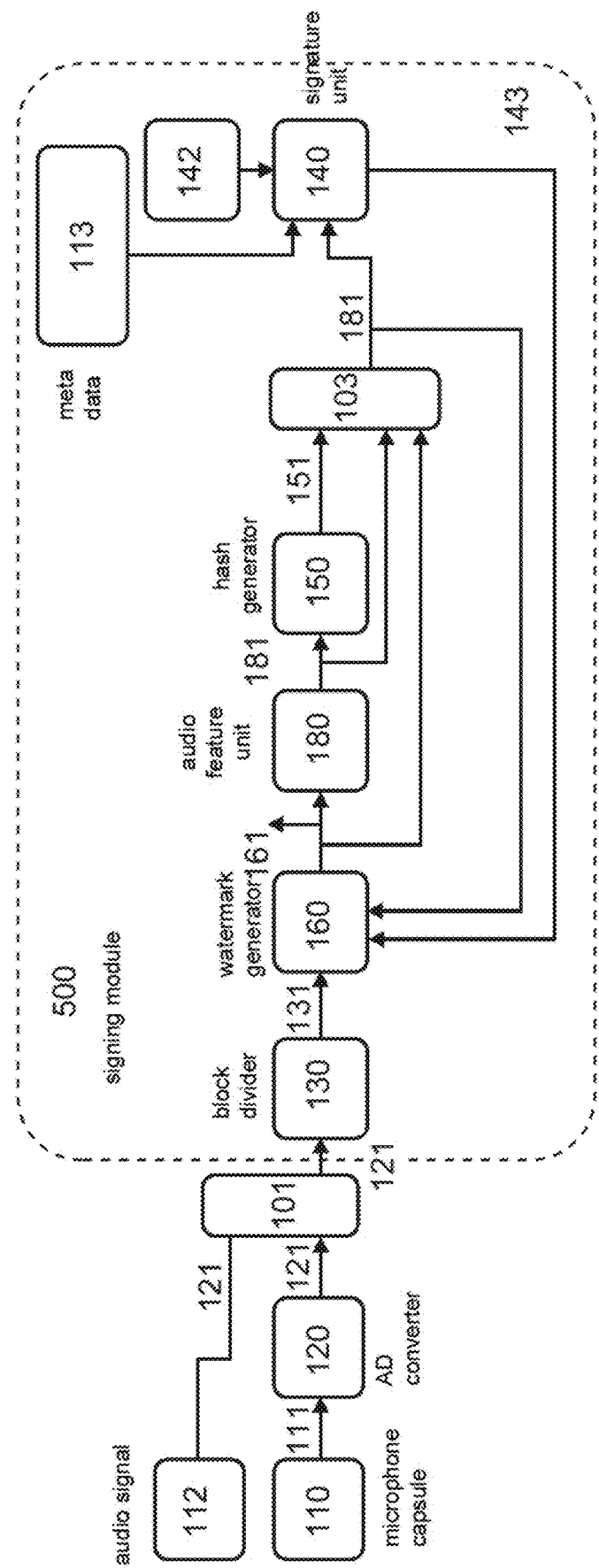
FIG. 8 shows a block diagram of an audio signal signing module.

FIG. 8 shows a block diagram of an audio signal signing module. The audio signal signing module of FIG. 8 substantially corresponds to the audio signal signing module of FIG. 6 or 7. Here, a block divider 130, a watermark generator 160, an audio feature unit 180 and a hash generator can be provided. The audio feature unit 180 and the hash generator 150 are optional. The block divider 130 receives the digital audio signal and divides the audio signal into a plurality of audio blocks 131. In the watermark generator 160, metadata can be embedded as watermark to the audio signal. The output 161 of the watermark generator 160 can be used as audio output. This is advantageous in particular if a low latency audio transmission is required, for example like a live performance. The audio blocks 131 can be processed by the audio feature unit 180 to extract audio features. The hash generator 150 can generate hash values 151 based on the audio blocks 131, the output 161 of the watermark generator and/or based on the audio feature 181 extracted by the audio feature unit 180. The output of the block divider, the output of the watermark generator, the output of the audio feature unit 180 and/or the output of the hash generator 151 can be used as input for the signature unit 140. As in the above examples, the signature unit 140 uses a private key 142 to sign the signal at its input and possibly further information, i.e. it generate a signature.

Figure 9:
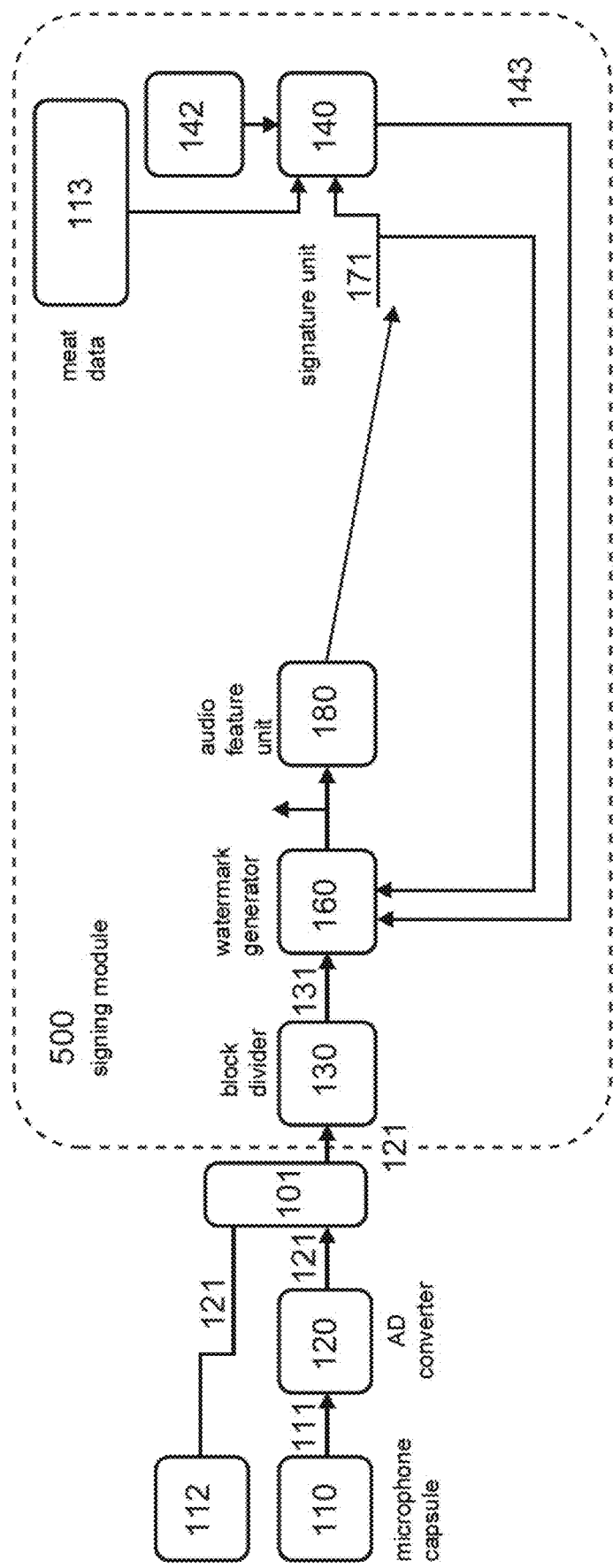
FIG. 9 shows a block diagram of an audio signal signing module.

FIG. 9 shows a block diagram of an audio signal signing module. The audio signal signing module can be based on the audio signal signing module according to FIG. 6, 7 or 8. In particular, the audio signal signing module 500 comprises a block divider 130, a watermark generator 160 and an audio feature unit 180.

According to an embodiment, a sequence of subsequent audio blocks 131 is processed and a watermark is embedded such that at the output 190, a sequence of audio subblocks is outputted. In an audio block N having a plurality of subblocks, an audio feature or audio features are extracted in the audio feature unit. The extracted features are digitally signed by the signature unit 140 and embedded as watermark in a subsequent audio block N+1. According to the example of FIG. 9 the audio feature of an audio block is embedded into the watermark of a subsequent audio block.

To reduce the latency e.g., for live applications the signed metadata of the current audio block could be output together with one following audio block or completely independent from the audio processing. Here the watermark that is added to the current audio block contains the signed metadata of the last audio block. Therefore, the algorithm does not need to wait until the whole block is captured before it could be output. The embedding of the watermark could work on smaller subblocks of the actual audio block. The latency of the whole process depends then on the processing time of the audio feature extraction, signing, watermark embedding and on the size of the subblock but not on the size of the whole audio block. Since the size of the subblock could be much smaller than the size of one audio block e.g., 20 ms which leads to a lower latency than embedding the audio features of one block into the same block.

For authentication the audio signal as well as the signed metadata is needed. The metadata might be provided via a side channel or might be embedded into the audio signal by watermarking. In case watermarking is used it must be read out from the audio signal. In case the watermarking readout needs the block boundaries one approach to achieve this is to try out different offsets of block boundaries until a successful watermark readout is possible.

Another approach could be to embed some synchronization signal with a watermark into the audio signal.

To authenticate an audio signal, it must be processed in blocks with the same boundaries used for the signing. Since the audio might be cut the block boundaries are not obviously known at authentication. In one approach where the signed metadata is provided separate to the audio signal, e.g., as metadata in an audio recording file, the metadata could be attached to timestamps that could be adjusted by the audio processing software that cut the audio. Then the block boundaries could be calculated from these timestamps. If this is not the case another approach could try to assume the recording starts with a whole signed block and try to authenticate that with the available metadata. If that does not work it could be repeated with, e.g., a sample offset and so on. If even an offset larger than the block size does not lead to a successful authentication, it might assume the signal cannot be authenticated. If one offset leads to a successful authentication the block boundaries can be calculated from that offset.

To authenticate also slightly altered audio signals (e.g., in case the volume is changed or an equalizer is used) a pre-described method without hashing should be used. In case the audio signal itself or the audio features are used and differ, a similarity measurement could be used in combination with a threshold to decide if a signal has been altered too much or if it is still authentic. The acceptable threshold might differ for different use cases.

To enhance the security of the system it makes sense to establish a process that allows to withdraw keys e.g., in case they are stolen.

The public keys for authentication can be provided in various ways. One option is to store all public keys in one centralized database to make it easy to find the needed key. To tackle potential trust issues in this central instance the database with all public keys could be provided on a distributed ledger technology. Another option is that the organization/person that uses the technology provides the public key on their own website.

LIST OF REFERENCE SIGNS 100 microphone
101 OR unit
102 audio signal metadata
103 OR unit
110 microphone capsule
111 microphone audio signal
112 audio signal
113 metadata
120 AD converter
121 digital audio signal
130 block divider
131 audio blocks
140 private key signature unit
141 output
142 private key
143 signature output
150 hash generator
151 hash values
160 watermark generator
161 watermark
180 audio feature unit
181 audio related information
190 audio output
191 first audio output signal
192 second audio output signal 200 network
300 authenticator
400 server
401 public key
500 audio signal signing module

The invention claimed is:

1. A microphone, comprising:
a microphone capsule adapted to capture an audio signal;
an AD converter configured to convert the captured audio signal into a digital signal;
a block generator configured to divide the digital audio signal into a plurality of audio blocks and to associate a sequence number to each audio block;
a private key signature unit configured to generate at least one signature based on at least one of the plurality of audio blocks and its sequence number with a private key associated to the microphone; and
an audio output configured to output an authenticable audio signal comprising the at least one audio block and the generated at least one signature which contains the sequence number of the audio block;
wherein the sequence number in the at least one signature can be used later on for authenticating an audio block.

2. The microphone of claim 1, wherein
the at least one signature is generated based on at least one audio block or based on audio features of at least one audio block.

3. The microphone of claim 1, further comprising:
a hash generator configured to generate a hash value based on at least one audio block or a hash value based on audio features of at least one audio block;
wherein the private key signature unit is configured to generate a signature based on hash values of the audio blocks or hash values of the audio features,
wherein an audio output is configured to output the at least one audio block and the generated signatures.

4. The microphone of claim 1, further comprising:
a watermark generator configured to generate at least one watermark based on at least one audio block, based on the signature of the at least one audio block, based on the signed hash values for at least one audio block, or the signed hash value of the audio features of at least one audio block and introduce the watermark into the at least one audio block such that the audio signal with the embedded watermark is outputted via the audio output.

5. The microphone of claim 4, wherein
the watermark of an audio block is embedded in a subsequent audio block.

6. The microphone of claim 4, wherein
the at least one watermark also comprises metadata of the audio signal.

7. A method of generating an authenticable audio signal, comprising:
capturing an audio signal or receiving a captured audio signal;
converting the captured or received audio signal into a digital audio signal;
dividing the digital audio signal into a plurality of audio blocks;

associating a sequence number to each audio block;
generating a signature based on the audio blocks of the audio signal and its sequence number with a private key; and
outputting an authenticable audio signal comprising the at least one audio block and the generated signature which contains the sequence number of the audio block;
wherein the sequence number in the at least one signature can be used later on for authenticating an audio block.

8. The method of claim 7, further comprising:
generating a hash value based on at least one audio block or a hash value based on an audio feature of the at least one audio block in a hash generator.

9. The method of claim 7, further comprising:
generating a watermark by a watermark generator based on at least one audio block, based on the audio features of the at least one audio block, based on the signed hash values for at least one audio block, or the signed hash value of the audio features of at least one audio block;
and introducing the watermark into at least one audio block such that the audio signal together with the embedded watermark is outputted.

10. The method of claim 9, wherein
at least one watermark comprises metadata of the audio signal.

11. The method of claim 7, wherein
a watermark associated to an audio block is embedded into a subsequent audio block.

12. The method of claim 7, further comprising:
detecting the audio blocks; and
verifying a signature of at least one audio block based on a public key.

13. The method of claim 12, further comprising:
extracting hash values from the audio block;
verifying the signature of the hash values based on a public key associated to the private key of the microphone;
comparing the extracted hash values with hash values determined based on the received audio blocks.

14. A method of generating an authenticable audio signal, comprising:
receiving a digital audio signal captured by a microphone or receiving an audio signal;
dividing the digital audio signal into a plurality of audio blocks;
associating a sequence number to each audio block;
generating at least one signature of at least one audio feature of the audio blocks and its sequence number with a private key;
wherein the sequence number in the at least one signature can be used later on for authenticating an audio block.

15. The method of claim 14, comprising:
generating a watermark by a watermark generator based on at least one audio block, based on the audio features of the at least one audio block, based on the signed hash values for at least one audio block, or the signed hash value of the audio features of at least one audio block;
and introducing the watermark into at least one audio block such that the audio signal together with the embedded watermark is outputted.

16. A method of authenticating a received audio signal, comprising:
analyzing a received digital audio signal to determine block boundaries of the audio block in the audio signal;
extracting at least one signature from at least one of the received audio blocks;
extracting a sequence number from the extracted signature, the sequence number corresponding to the sequence number associated to the audio block during a generation of an authenticable audio signal according to claim 14; and
comparing the extracted sequence number of the audio block with at least one extracted sequence number of a previous or subsequent audio block from the received audio signal to determine whether one or more audio blocks have been removed from the audio signal.

17. An authenticable audio signal generator, comprising:
a block generator configured to divide a digital audio signal into a plurality of audio blocks and to associate a sequence number to each audio block;
a private key signature unit configured to generate at least one signature based on at least one of the plurality of audio blocks and its sequence number with a private key associated to the microphone; and
an audio output configured to output an authenticable audio signal comprising the at least one audio block and the generated at least one signature which contains the sequence number of the audio block;
wherein the sequence number in the at least one signature can be used later on for authenticating an audio block.

* * * * *